United States Patent Office 3,036,879
Patented May 29, 1962

3,036,879
PRODUCT AND PROCESS FOR INHIBITING CORROSION
Robert W. H. Chang, St. Paul, Minn., assignor to General Mills, Inc., a corporation of Delaware
No Drawing. Filed May 14, 1959, Ser. No. 813,051
3 Claims. (Cl. 21—2.7)

The present invention relates to a new and useful method for inhibiting the corrosion of metal surfaces and to nontoxic corrosion inhibiting compositions.

The inhibition of the internal corrosion of metal food containers has been a subject of interest to the container industry for many years. Many agents which are normally effective as corrosion inhibitors for the metals of which containers are formed cannot be used when the container is intended to provide storage of a food item as these compounds are toxic in themselves or may form toxic substances upon decomposition or chemical reaction with the metal of the container or its food contents.

I have now made the unexpected discovery that certain arginine salts have physical and chemical characteristics which provide many advantages as corrosion inhibitors. The arginine salts which exhibit corrosion in hibiting action are diarginine fumarate and arginine acetate. These salts are readily water soluble and are nontoxic in themselves. Furthermore, they do not form toxic substances upon decomposition or reaction with the metals of the container or its food contents.

It is therefore an object of the present invention to disclose a method of inhibiting corrosion.

It is also an object of this invention to disclose corrosion inhibiting agents which are nontoxic and are readily soluble in aqueous media.

The compounds of the present invention are especially effective as corrosion inhibiting agents for ferrous-containing metals, and I find it preferable when utilizing these agents for this purpose to utilize 1% of the corrosion inhibiting compound as based on weight of the aqueous medium.

In many instances it may be possible to employ a lower concentration of the agent and obtain the effective corrosion inhibition. Higher amounts of the agent may, of course, be employed but offer no particular advantage other than the nutritive supplement value of the arginine compound.

The preparation of these novel arginine compounds and their use as nontoxic corrosion inhibitors is further illustrated by the following examples:

*Example I*

(1) Prepartion of diarginine fumarate monohydrate: L-arginine free base, 1 mol, and fumaric acid, 0.5 mol, are dissloved in water and the solution is filtered to remove any insolubles. The solution is evaporated at 70° C. under reduced pressure to dryness and the solids are further dried in a vacuum oven at 70° C. overnight. The salt, diarginine fumarate monohydrate, has the folllowing analysis:

Percent moisture _____ 3.62
Percent nitrogen (moisture free) _____ 23.9
Percent nitrogen (theory) _____ 24.11
Percent purity _____ 99.1
$\alpha_D^{26} = +11.25$.
C.=5% in water.

(2) Mild steel SAE 1020 coupons were suspended in a 1% diarginine fumarate monohydrate solution and distilled water as control. After one week standing at room temperature, the coupons were taken out and cleaned, dried and weighed. The loss of weight compared with the control is an index of corrosion.

(a) Control—coupon in distilled water
    Loss in weight after one week=0.0152 g.
(b) Coupon in 1% diarginine fumarate monohydrate
    Loss in weight after one week=0
    Percent inhibition=100%

*Example II*

(1) Preparation of arginine acetate: L-arginine free base, 1 mol, and glacial acetic acid, 1 mol, are dissolved in water and the solution is filtered. The filtrate is evaporated at 50° C. under reduced pressure until the solution is cloudy and absolute methanol is added. The solids are removed by filtration and the solids are dried in a vacuum oven at 70° C. overnight. The L-arginine acetate has the following analysis:

Percent nitrogen (moisture free) _____ 23.81
Percent nitrogen (theory) _____ 23.92
Percent purity _____ 99.6
$\alpha_D^{25} = +27.0$.
C.=2.47% in 6 N HCl.

(2) The procedure of Example I, part 2, is repeated using 1% L-arginine acetate solution. The percentage of inhibition of corrosion was 100%.

Coupons of mild steel were used in the above examples as it is most representative of the metals employed in the manufacture of the container commonly referred to as the "tin can."

It will be readily apparent from the results of the above examples that arginine acetate and diarginine fumarate are effective edible corrosion inhibitors which prevent the corrosion of ferrous metals such as are used in the common food-containing metal container.

Many modifications and variations of this invention as hereinbefore set forth may be made without departing from the spirit and scope thereof, and therefore only such limitations should be imposed as are indicated in the appended claims.

I claim:
1. A process for preventing corrosion of metallic surfaces coming in contact with media having corrosive properties which comprises adding to said media a compound selected from the group consisting of arginine acetate and diarginine fumarate.
2. Diarginine fumarate.
3. Diarginine fumarate monohydrate.

References Cited in the file of this patent

UNITED STATES PATENTS

| | | |
|---|---|---|
| 2,739,981 | Szabo et al. | May 27, 1956 |
| 2,851,482 | Barker et al. | Sept. 9, 1958 |
| 2,923,599 | Toekelt | Feb. 2, 1960 |
| 2,931,700 | Oakes | Apr. 5, 1960 |

OTHER REFERENCES

Baker: "Volatile Rust Inhibitors," NRL Report 4319, PB111407, 1954, p. 5.

Walker et al.: "The Formation of Arginosuccinic Acid From Arginine and Fumarate," Chem. Abstracts 47: 100032c (J. Biol. Chem. 203, 143–52, 1953).